(No Model.)
F. B. BADT.
MULTIPLE SERIES SYSTEM OF ELECTRICAL DISTRIBUTION.
No. 557,099. Patented Mar. 31, 1896.
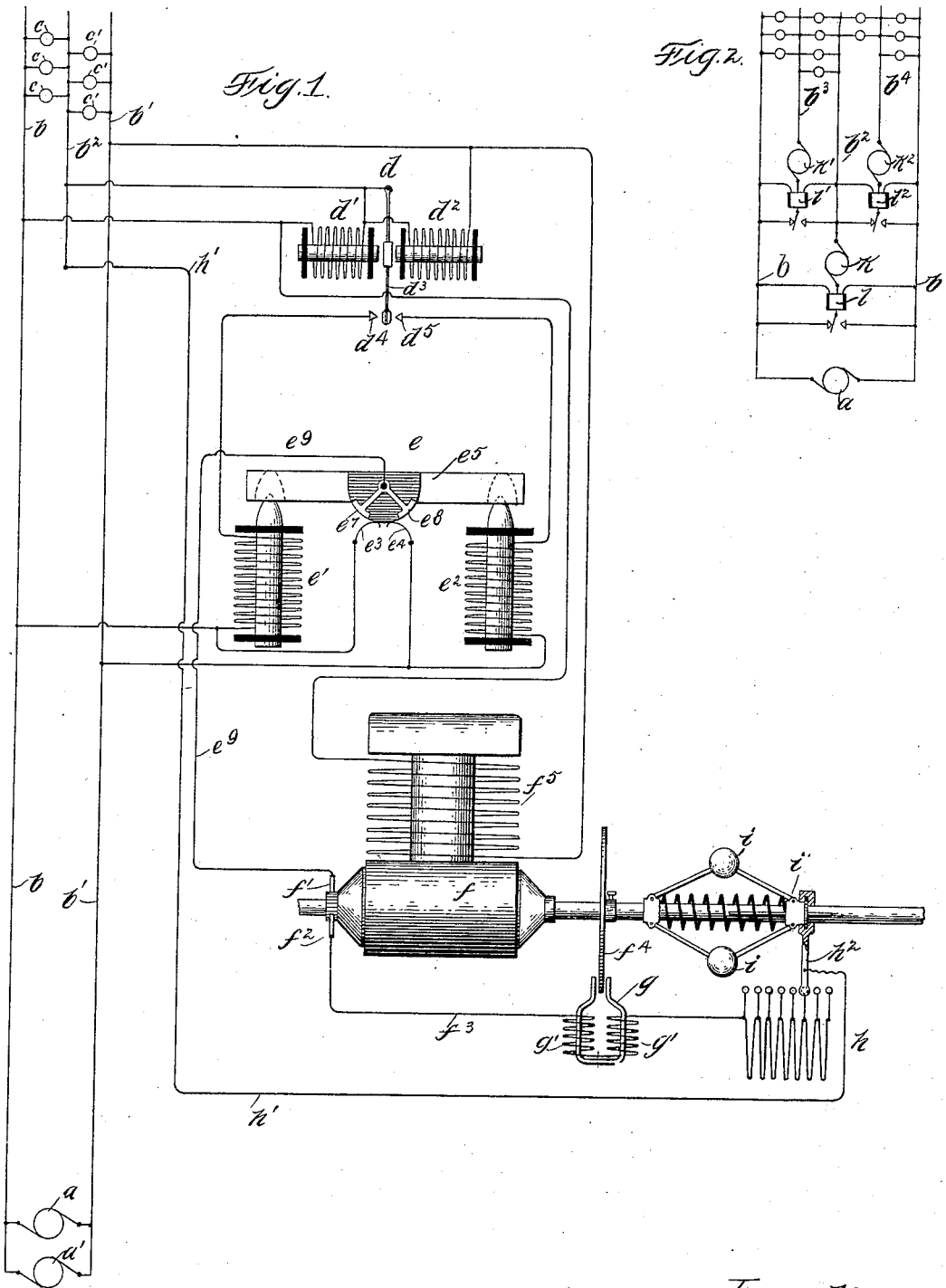
Witnesses:
George L. Cragg.
W. Clyde Jones.
Inventor:
Francis B. Badt.
By Barton & Brown
Attorneys.

UNITED STATES PATENT OFFICE.

FRANCIS B. BADT, OF CHICAGO, ILLINOIS, ASSIGNOR TO THE SIEMENS & HALSKE ELECTRIC COMPANY OF AMERICA, OF SAME PLACE.

MULTIPLE-SERIES SYSTEM OF ELECTRICAL DISTRIBUTION.

SPECIFICATION forming part of Letters Patent No. 557,099, dated March 31, 1896.

Application filed September 25, 1895. Serial No. 563,601. (No model.)

*To all whom it may concern:*

Be it known that I, FRANCIS B. BADT, a citizen of the United States, residing at Chicago, in the county of Cook and State of Illinois, have invented new and useful Improvements in Multiple-Series Systems of Electrical Distribution, of which the following is a specification.

My invention relates to a multiple-series system of electrical distribution, my object being to provide means for operating translating devices in multiple series and regulating the voltage between the several conductors between which the translating devices are connected.

In the Hopkinson three-wire system two generators are provided connected in series, while three conductors extend from the generators to the district to be supplied with current, two of the conductors, termed "main conductors," being connected between the outside brushes of the connected generators, while the third or compensating conductor is connected with the joined brushes of the two generators. The translating devices are connected in multiple between the main conductors and the compensating conductor. As the number of translating devices upon either side of the compensating conductor is varied, some means must be provided for affording a path for the excess of current flowing over the side of the circuit carrying the heavier current and for maintaining the voltage of the neutral conductor constant with relation to the other conductors, and in the Hopkinson three-wire system the compensating conductor affords a path for the excess of current back to the generator, and as a generator is connected between each main conductor and the compensating conductor the voltage of the compensating conductor is maintained constant with relation to the other conductors thereby. This system, however, is objectionable, as it necessitates the employment of two generators in series and a third conductor extending from the generator to the distant district to be supplied; and it is the object of the present invention to dispense with the third conductor and the two generators connected in series, while securing all of the advantages of the multiple-series system.

In accordance with the present invention a single generator or several generators in multiple are connected between a pair of main conductors which extend to the district to be supplied with current. The translating devices are connected in groups between the two main conductors and a third or intermediate conductor. A motor is provided adapted to be controlled by an automatic switch for connecting the same in circuit upon either side of the compensating conductor. The motor may be located at the central station or it may be located in the distant district to be supplied with current. The automatic switch acts to connect the motor upon the side of the compensating conductor which is underloaded, whereby a path through the motor is provided for the excess of current, while the counter electromotive force of the motor maintains the voltage at the proper amount.

My invention is not only applicable to the three-wire multiple-series system, but also when four, five, or any greater number of wires is employed. I preferably employ an automatic switch adapted to respond to changes of current strength to switch the motor into circuit upon one or the other of the sides of the system as the load varies. In order to secure proper regulation the load upon the motor must be varied in accordance with the strength of the excess of current flowing through the motor, and for this purpose I provide a magnetic brake, the retarding effect of which varies in accordance with the change of the strength of the current flowing through the motor.

Referring to the accompanying drawings, Figure 1 is a view in diagram illustrating the system of distribution of my invention. Fig. 2 is a diagram showing my invention as applied to a five-wire system of distribution.

Like letters refer to like parts in both figures.

Two generators $a$ $a'$ are shown in Fig. 1 connected between the main conductors $b$ and $b'$, which extend to the district to be supplied with current. Between the main conductors $b$ $b'$ and a neutral conductor $b^2$ two groups of translating devices $c$ $c$ and $c'$ $c'$ are connected. The coil $d'$ of a relay $d$ is connected between the main conductor $b$ and the neutral conductor $b^2$, while the coil $d^2$ of the relay is connected between the main conductor $b'$ and the neutral conductor $b^2$. The neutral conductor $b^2$ is connected with a swinging contact-arm $d^3$ adapted to alternately engage the contact-anvils $d^4$ $d^5$. The contact $d^4$ is connected to the coil $e'$ of the switch $e$, the circuit then extending to the main conductor $b$. Likewise, the contact $d^5$ is connected with the coil $e^2$ and thence to the main conductor $b'$. A contact-spring $e^3$ is connected with the main conductor $b$, while a contact-spring $e^4$ is connected with the main conductor $b'$. Upon the armature-lever $e^5$ are carried contact-plates $e^7$ $e^8$ connected by a conductor $e^9$ with the brush $f'$ of the motor $f$, the opposite brush $f^2$ of the motor being connected with the conductor $f^3$ extending to the coils $g'$ $g'$ of the retarding electromagnet $g$, between the poles of which a copper disk $f^4$ carried upon the shaft of the armature is adapted to revolve. The circuit extends from the coils $g'$ $g'$ to the rheostat $h$ and thence by conductor $h'$ to the middle or neutral conductor $b^2$. The field-coils $f^5$ of the motor are connected between the main conductors $b$ $b'$. Other means of exciting the field-magnets may be used if desired. Upon the shaft of the motor are mounted governor-balls $i$ $i$ adapted to move outward to move the sleeve $i'$ longitudinally upon the motor-shaft and thus move the contact-arm $h^2$ of the rheostat over the rheostat terminals to cut out resistance.

When the groups of translating devices upon opposite sides of the neutral conductor $b^2$ require the same quantity of current, the current passes directly from one main conductor to the other through the translating devices and through the coils $d'$ $d^2$ of the relay $d$ in series, the two coils being thus equally energized to maintain the arm $d^3$ in its middle or neutral position. Should some of the translating devices—$c'$, for instance—be cut out of circuit, the voltage would be disturbed and the translating devices $c$ would receive less than their full quota of current, while the translating devices $c'$ would receive an excessive current. Likewise, the coil $d^2$ would receive current in excess of the coil $d'$ and the lever $d^3$ would be moved into contact with the contact-anvil $d^5$, thus closing circuit from neutral conductor $b^2$ through lever $d^3$, contact-anvil $d^5$, coil $e^2$ to main conductor $b'$. The coil $e^2$ is thus energized and the electromagnet attracts the armature-lever $e^5$, rocking the same upon its pivot and bringing the contact $e^8$ into engagement with the spring $e^4$, thus closing circuit from the neutral conductor $b^2$, over conductor $h'$, through rheostat $h$, electromagnet $g$, motor $f$, conductor $e^9$, contact $e^8$, spring $e^4$, to the main conductor $b'$. The motor $f$ is thus connected in circuit between the neutral conductor $b^2$ and the main conductor $b'$ in multiple with the translating devices $c'$ $c'$. A path to the motor $f$ is thus afforded for the excess of current, and as the motor increases in speed the contact-arm $h^2$ of the rheostat is moved to the left to gradually cut out the resistance. The passage of the current through the electromagnet $g$ energizes said electromagnet, and the rotation of the copper disk $f^4$ between the poles of the magnet sets up eddy-currents in the disk, which react to oppose the rotation of the disk. A load is thus thrown upon the motor proportional to the strength of the current flowing. The counter electromotive force of the motor, when at normal speed, is of a value to maintain the voltage between the neutral conductor $b^2$ and the main conductor $b'$ at the required amount, so long as the motor is connected between the two conductors $b^2$ and $b'$. Should more of the lamps $c'$ be cut out of circuit, a greater current flows through the motor, which, however, does not alter the counter electromotive force of the motor, as the increase of current increases the magnetization of the electromagnet $g$ to throw a correspondingly greater load upon the motor. Should the excess of current flowing through the motor be decreased by cutting in some of the translating devices $c'$, the load upon the motor will be correspondingly decreased. Should some of the translating devices $c$ $c$ be cut out of circuit, so that the load upon the conductors $b$ $b^2$ is less than the load upon the conductors $b^2$ $b'$, the coil $d'$ will be traversed by a current greater in strength than that traversing the coil $d^2$, and the arm $d^3$ will be moved into engagement with the anvil $d^4$, thus closing circuit from the conductor $b$, through coil $e'$, contact $d^4$, arm $d^3$, to the neutral conductor $b^2$. Coil $e'$ is thus energized and the armature-lever $e^5$ is attracted to move the contact $e^7$ into engagement with the contact-spring $e^3$, thus closing circuit from conductor $b$, through spring $e^3$, contact $e^7$, conductor $e^9$, motor $f$, electromagnet $g$, rheostat $h$, conductor $h'$, to the neutral conductor $b^2$. The current through the motor $f$ is thus reversed and the motor-armature rotates in the opposite direction, the motor being connected between the conductors $b$ $b^2$ and being in multiple with the translating devices $c$ $c$. The excess of current now finds a path through the motor, and the counter electromotive force of the motor maintains the voltage between the conductors $b$ and $b^2$ at the proper value.

In Fig. 2 is illustrated a system of distribution in which the generator $a$ is connected with main conductors $b$ $b'$ extending to the district to be supplied, a neutral conductor $b^2$ being provided, between which and one or the other of the conductors $b$ $b'$ a motor $k$ is adapted to be connected by controlling apparatus $l$. Between the conductors $b$ and $b^2$ is an intermediate conductor $b^3$, between which and one or the other of the conductors $b$ $b^2$ a motor $k'$ is adapted to be connected by controlling apparatus $l'$. Likewise, an intermediate conductor $b^4$ is provided between the conductors $b^2$ $b'$, between which conductor and either of the conductors $b^2$ $b'$ a motor $k^2$ is adapted to be connected by means of controlling apparatus $l^2$.

Having described my invention, what I claim as new, and desire to secure by Letters Patent, is—

1. The herein-described method of regulating a multiple-series system of distribution, which consists in passing an electric current through the translating devices in multiple series, diverting a portion of the current from the overloaded side, passing said diverted current through an electric motor, opposing to the rotation of the motor a force independent of the current-supply and varying in accordance with the strength of the current flowing through the motor, and shifting said motor from one side of the system to the other to maintain the same in circuit with the underloaded side; substantially as described.

2. In a multiple-series system of electrical distribution, the combination with translating devices connected in multiple series between main and compensating conductors, of an electric motor, controlling apparatus for automatically shifting said motor from one side of the system to the other to maintain the motor in circuit with the underloaded side, and a retarding or opposing device independent of the supply system for opposing the rotation of the motor, the retarding effect of said retarding device varying in accordance with the variation of the current passing through the motor; substantially as described.

3. In a multiple-series system of electrical distribution, the combination with translating devices connected in multiple series between main and compensating conductors, of a controlling device for automatically connecting said motor in circuit with the underloaded side of the system, and an electromagnetic retarding device having coils connected in series with the motor for opposing the rotation of the motor; substantially as described.

4. The combination with translating devices connected in multiple series between main conductors and a compensating conductor, of a pair of electromagnets, one connected between the compensating conductor and one of the main conductors and the other connected between the compensating conductor and the opposite main conductor, relay-contacts controlled by said electromagnets, a pair of switch-controlling electromagnets, one connected between the compensating conductor and one main conductor while the other is connected between the compensating conductor and the other main conductor, the circuit through said electromagnets being controlled by said contacts, an electric motor and an electromagnetic retarding device therefor responding to variations of current traversing the motor, and switch-contacts operated by said switch-controlling electromagnets for connecting said motor between the compensating conductor and one or the other of said main conductors; substantially as described.

5. The combination with translating devices connected in multiple series between main conductors and a compensating conductor, of the electromagnets $d'$ $d^2$ controlling the movement of the lever $d^3$, electromagnets $e'$ $e^2$ controlled by the movement of said lever $d^3$, switch-contacts $e^3$ $e^7$ and $e^4$ $e^8$ controlled by said electromagnets $e'$ $e^2$, motor $f$, retarding device $g$ $f^4$, rheostat $h$, and contact-arm $h^2$ controlled by a governor mounted upon the motor-shaft; substantially as described.

In testimony whereof I affix my signature in the presence of two witnesses.

FRANCIS B. BADT.

Witnesses:
CHARLES A. BROWN,
W. CLYDE JONES.